(12) United States Patent
du Castel et al.

(10) Patent No.: US 10,859,723 B2
(45) Date of Patent: Dec. 8, 2020

(54) SYSTEMS AND METHODS FOR USING STONELEY WAVES FOR BOTTOM-HOLE PROXIMITY DETECTION

(71) Applicant: Schlumberger Technology Corporation, Sugar Land, TX (US)

(72) Inventors: Bertrand du Castel, Austin, TX (US); Christoph Klieber, Clamart (FR); David Linton Johnson, Somerville, MA (US); Martin G. Lüling, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 477 days.

(21) Appl. No.: 15/815,310

(22) Filed: Nov. 16, 2017

(65) Prior Publication Data
US 2019/0146114 A1    May 16, 2019

(51) Int. Cl.
*G01V 1/46* (2006.01)
*G01V 1/50* (2006.01)
*G01V 1/053* (2006.01)

(52) U.S. Cl.
CPC .............. *G01V 1/46* (2013.01); *G01V 1/50* (2013.01); *G01V 1/053* (2013.01); *G01V 2210/1295* (2013.01); *G01V 2210/1299* (2013.01); *G01V 2210/1425* (2013.01); *G01V 2210/1429* (2013.01); *G01V 2210/679* (2013.01)

(58) Field of Classification Search
CPC ...... G01V 1/46; G01V 1/50; G01V 2210/679; G01V 1/053; G01V 2210/1299; G01V 2210/1295; G01V 2210/1429; G01V 2210/1425
USPC ....................................... 367/31, 35
See application file for complete search history.

(56) References Cited

U.S. PATENT DOCUMENTS

| | | | |
|---|---|---|---|
| 8,811,114 B2 * | 8/2014 | Geerits | G01V 1/48 367/25 |
| 2015/0322782 A1 * | 11/2015 | Khajeh | E21B 49/10 166/250.01 |

OTHER PUBLICATIONS

Williams et al., Pseudo-Random Sequences and Arrays, Proceedings of IEEE, vol. 64, No. 12, 1976, pp. 1715-1729.
Hsu et al., Tube waves and mandrel modes: Experiment and theory, Journal of Acoustical Society of America 102 (6), Dec. 1997.

* cited by examiner

*Primary Examiner* — Daniel L Murphy (57) ABSTRACT

A downhole tool system may include a Stoneley wave emitter, located in a downhole tool, designed to emit Stoneley waves into a borehole. The downhole tool system may include one or more Stoneley wave sensors, located in the downhole tool, and a processor. The processor may be designed to receive signals from the one or more Stoneley wave sensors based on the detection of the Stoneley waves. The processor may use the signals to obtain a temporal measurement of the Stoneley waves. Based at least in part on the temporal measurement, the processor may calculate a distance from the downhole tool or a bottom-hole assembly to the bottom of the borehole.

18 Claims, 7 Drawing Sheets

SYSTEMS AND METHODS FOR USING STONELEY WAVES FOR BOTTOM-HOLE PROXIMITY DETECTION

BACKGROUND

This disclosure relates to using Stoneley waves in an acoustic logging tool to monitor the borehole ahead of the bottom-hole assembly to get an accurate measure of the distance to the bottom of the borehole.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a borehole drilled into a geological formation is a remarkably complex endeavor. In many cases, hydrocarbon exploration and production may be informed by measurements from downhole well-logging tools and sensors that are conveyed deep into the borehole. The measurements may be used as part of the drilling process itself or to infer properties and characteristics of the geological formation surrounding the borehole. During drilling, however, some parts of the process may not have applicable sensors suitable for downhole conditions. For example, the depth of a drill string may be determined by a surface block position and a count of how many pipes have been used. However, this method may lead to uncertainty in determining the position of the drill string in relation to the bottom of the borehole.

As will be appreciated, once the drill string is in the borehole, it is not continuously boring. On the contrary, the drill string is often pulled off the bottom of the borehole during other tasks, such as adding a new pipe or when conditions command some other downhole operation. However, relying simply on a pipe count and a surface block position may lead to considerable uncertainty and is susceptible to human error. In fact, when the drill string is lowered to the bottom of the borehole—an event referred to as tagging bottom—great care is taken to minimize the impact of landing and optimize the mechanics of resuming drilling. Thus, lowering the drilling string may be a very slow process to avoid damage due to this uncertainty.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To better enhance the measurement of the distance to the bottom of a borehole, Stoneley waves may be emitted and detected by a downhole tool.

Indeed, in one example, a downhole tool system may include a Stoneley wave emitter, located in a downhole tool, designed to emit Stoneley waves into a borehole. The downhole tool system may also include one or more Stoneley wave sensors, located in the downhole tool, and a processor. The processor may be designed to receive signals from the one or more Stoneley wave sensors based on the detection of the Stoneley waves. The processor may use the signals to obtain a temporal measurement of the Stoneley waves. Based at least in part on the temporal measurement, the processor may calculate a distance from the downhole tool or a bottom-hole assembly to the bottom of the borehole.

In another embodiment, a method may include emitting, from a downhole tool, multiple Stoneley waves into a borehole in a pulse sequence. The method may also include detecting, via multiple sensors, the multiple Stoneley waves traveling in the borehole. The method may also include calculating, via a processor, a speed of the Stoneley waves in the borehole. The processor may also calculate a distance from the downhole tool to the bottom of the borehole based at least in part on the speed of the Stoneley waves in the borehole and a time between detections of the plurality of Stoneley waves. Based at least in part on the calculated distance from the downhole tool to the bottom of the borehole, the impact of the downhole tool with the bottom of the borehole may then be reduced or minimized.

In another embodiment, machine-executable instructions, stored on a tangible, non-transitory machine readable storage medium, may be implemented by a machine. When executed by the machine, the instructions may cause the machine to perform a method. The method may include controlling an emission of one or more Stoneley waves at multiple locations in a borehole. The method may also include processing signals received from one or more Stoneley wave sensors, wherein the signals are representative of the one or more Stoneley waves sensed within the borehole. The method may also include calculating a direction of travel of the one or more Stoneley waves and a roundtrip time of the one or more Stoneley waves propagating down the borehole and reflecting back to the one or more Stoneley wave sensors based at least in part on the direction of travel of the one or more Stoneley waves. The method may also include calculating a distance from a bottom-hole assembly to the bottom of the borehole based at least in part on the roundtrip time of the one or more Stoneley waves.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as exploration, drilling, logging, extraction, transportation, refinement, retail, and so forth. During exploration and drilling, boreholes may be drilled into the ground for reasons that may include discovery, observation, or extraction of resources. These resources may include oil, gas, water, or any combination of elements within the ground.

Boreholes, sometimes called wellbores, may be straight or curved holes drilled into the ground from which resources may be discovered, observed, and/or extracted. The creation of a borehole may consist of boring through a geological formation using a drill and a multitude of sensors that measure and/or monitor the drilling process and logging information about the borehole. However, drilling may not be a continuous process. On the contrary, the drill bit is often pulled off the bottom of the borehole during tasks such as adding a new pipe or when conditions command some other downhole operation. When the drill string is lowered to the bottom of the borehole (i.e., tags bottom) great care must be taken to minimize the impact of landing and optimize the mechanics of resuming drilling. As such, an accurate measure of the distance to the bottom of the borehole may improve safety and speed and reduce costs and inadvertent damages. In one example, the depth of the drill bit on the end of a drill string may be determined by a surface block position and a count of how many pipes have been used. However, the uncertainty with this type of measurement may be greater than desired.

Another measurement uses an acoustic tool located within the borehole to estimate the distance from the drill bit to the bottom of the borehole. Additionally, the acoustic tool may be used in well-logging. Performed during and/or after the formation of a borehole, well logging may include making a detailed record of the geological formations penetrated by a borehole using one or more sensors. In well-logging, an acoustic tool may generate and/or detect Stoneley waves, also known as tube waves, to estimate properties of the borehole wall, such as fractures and permeability.

Stoneley waves are boundary waves, also known as interface waves, which propagate along the wall of the borehole. While Stoneley waves generally refer to solid-solid interfaces, sonic measurements taken using Scholte waves, which occur along a liquid-solid interface, or other sonic or ultrasonic waves may also be used in certain embodiments. The physical waves, which may include vibrations, may propagate, reflect, and transmit differently within the borehole depending on the physical attributes of the borehole that the waves encounter. As such, Stoneley waves may be used to estimate the location of the bottom of the borehole in relation to a tool near the drill bit, and, by extension, may actively measure the distance between the drill bit and the bottom of the borehole.

Figure 1:
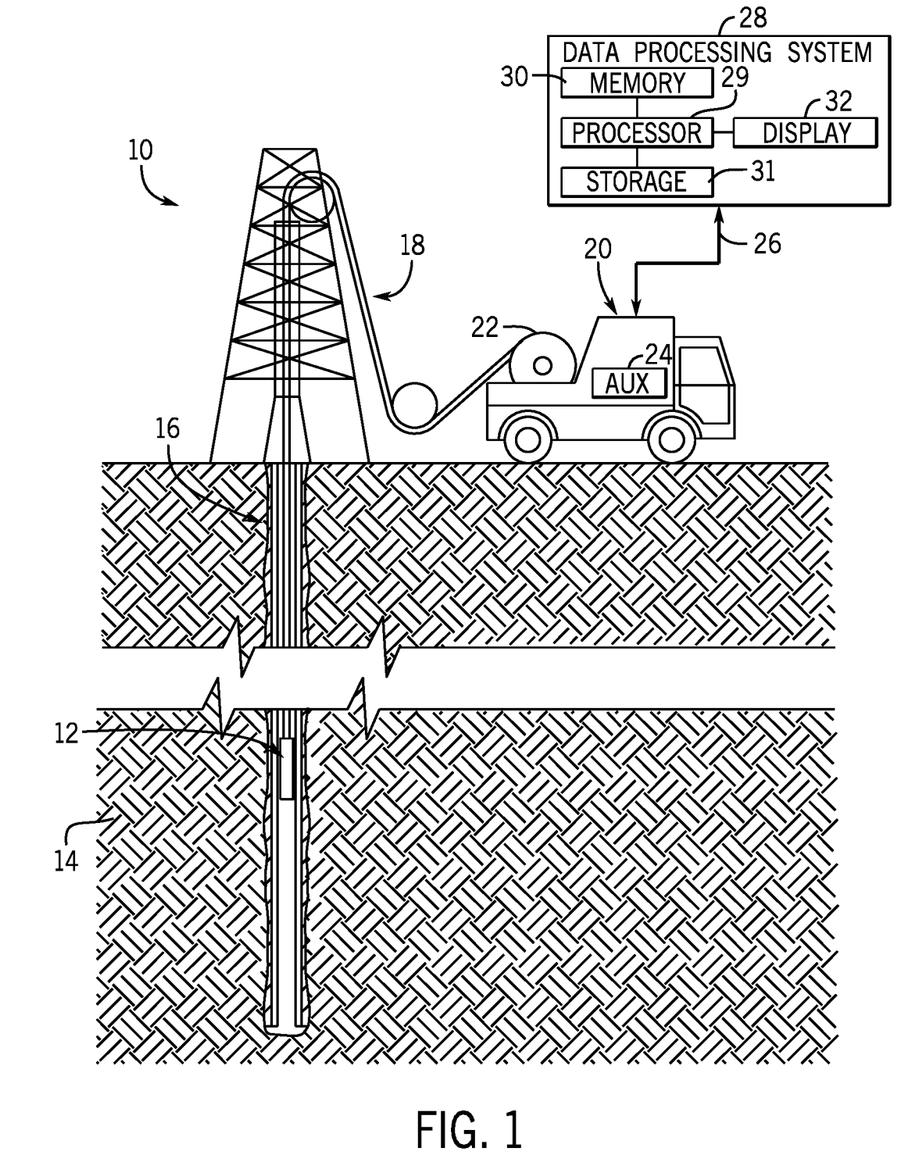
FIG. 1 is a schematic diagram of a well-logging system including an acoustic tool, in accordance with an embodiment.

With the foregoing in mind, FIG. 1 illustrates a well-logging system 10 that may employ the systems and methods of this disclosure. The well-logging system 10 may be used to convey an acoustic tool 12 through a geological formation 14 via a borehole 16. In the example of FIG. 1, the acoustic tool 12 is conveyed on a cable 18 via a logging winch system 20 (e.g., vehicle). Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well-logging may be used. The cable 18 may be spooled and unspooled on a drum 22 and an auxiliary power source 24 may provide energy to the logging winch system 20 and/or the acoustic tool 12.

Moreover, while the acoustic tool 12 is described as a wireline downhole tool, it should be appreciated that any suitable conveyance may be used. For example, the acoustic tool 12 may instead be conveyed as a logging-while-drilling (LWD) tool as part of a bottom-hole assembly (BHA) of a drilling system (described below), conveyed on a slickline or via coiled tubing, and so forth. For the purposes of this disclosure, the acoustic tool 12 may be any suitable downhole tool that uses Stoneley waves within the borehole 16 (e.g., downhole environment).

As discussed further below, the acoustic tool 12 may receive energy from an electrical energy device or an electrical energy storage device, such as the auxiliary power source 24 or another electrical energy source to power the tool. Additionally, in some embodiments the acoustic tool 12 may include a power source within the acoustic tool 12, such as a battery system or a capacitor to store sufficient electrical energy to emit and/or receive the Stoneley waves.

Communications 26, such as control signals, may be transmitted from a data processing system 28 to the acoustic tool 12, and communications 26, such as data signals, related to the results/measurements of the acoustic tool 12 may be returned to the data processing system 28 from the acoustic tool 12. The data processing system 28 may be any electronic data processing system that can be used to carry out the systems and methods of this disclosure. For example, the data processing system 28 may include one or more processors 29, which may execute instructions stored in memory 30 and/or storage 31. As such, the memory 30 and/or the storage 31 of the data processing system 28 may be any suitable article of manufacture that can store the instructions. The memory 30 and/or the storage 31 may be read-only memory (ROM), random-access memory (RAM), flash memory, an optical storage medium, or a hard disk drive, to name a few examples. A display 32, which may be any suitable electronic display, may display images generated by the processor 29. The data processing system 28 may be a local component of the logging winch system 20 (i.e., on the surface), within the acoustic tool 12 (i.e., downhole), a remote device that analyzes data from multiple logging winch systems 20, a device located proximate to the drilling operation, or any combination thereof. In some embodiments, the data processing system 28 may be a mobile computing device (e.g., tablet, smart phone, or laptop) or a server remote from the logging winch system 20.

Figure 2:
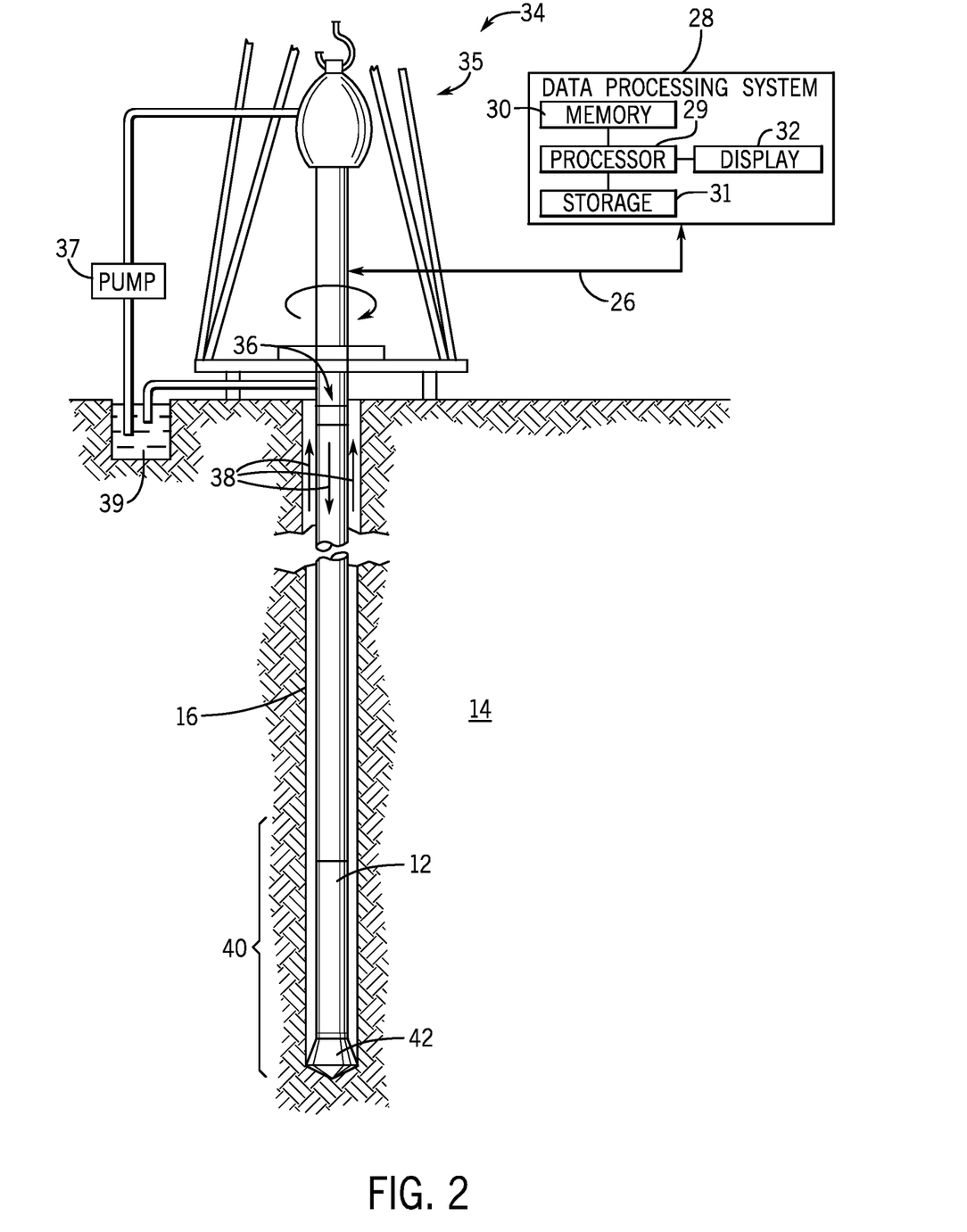
FIG. 2 is a schematic diagram of a drilling system including an acoustic tool, in accordance with an embodiment.

As stated above, the acoustic tool 12 may also be implemented as part of a drilling system 34, as illustrated in FIG. 2. The drilling system 34 may be used to drill a borehole 16 into a geological formation 14. In the drilling system 34, a drilling rig 35 may rotate a drill string 36 within the borehole 16. As the drill string 36 is rotated, a drilling fluid pump 37 may be used to pump drilling fluid, which may be referred to as "mud" or "drilling mud," downward through the center of the drill string 36, and back up around the drill string 36, as shown by reference arrows 38. At the surface, return drilling fluid may be filtered and conveyed back to a mud pit 39 for reuse. The drilling fluid may travel down to the bottom of the drill string 36 known as the bottom-hole assembly (BHA) 40. The drilling fluid may be used to rotate, cool, and/or lubricate a drill bit 42 which may be a part of the BHA 40. The fluid may exit the drill string 18 through the drill bit 42 and carry drill cuttings away from the bottom of a borehole 16 back to the surface.

The BHA 40 may include the drill bit 42 along with various downhole tools (e.g., acoustic tool 12). The downhole tools, such as the acoustic tool 12, may collect a variety of information relating to the geological formation 14 and the state of drilling in the borehole. For instance, the downhole tools may be LWD tools that measure physical properties of the geological formation 14, such as density, porosity, resistivity, lithology, and so forth. Likewise, the downhole tools may be measurement-while-drilling (MWD) tools that measures certain drilling parameters, such as the temperature, pressure, orientation of the drill bit 42, and so forth.

The downhole tools, such as the acoustic tool 12, may collect a variety of data that may be stored and processed in the BHA 40, or be sent via communications 26 to the surface for processing via any suitable telemetry (e.g., electrical signals pulsed through the geological formation 14 or mud pulse telemetry using the drilling fluid). As with the well-logging system 10, a data processing system 28 may include a processor 29, memory 30, storage 31, and/or a display 32.

As such, the memory 30 and/or the storage 31 of the data processing system 28 may be any suitable article of manufacture that can store the instructions. The memory 30 and/or the storage 31 may be ROM memory, random-access memory (RAM), flash memory, an optical storage medium, or a hard disk drive, to name a few examples. The display 32 may be any suitable electronic display that can display the well-logs and/or other information relating to properties of the borehole 16 as measured by the downhole tools (e.g., acoustic tool 12). It should be appreciated that, although the data processing system 28 is shown by way of example as being located at the surface, the data processing system 28 may be located in the BHA 40, remotely off-site, or at any location suitable for the application.

Figure 3:
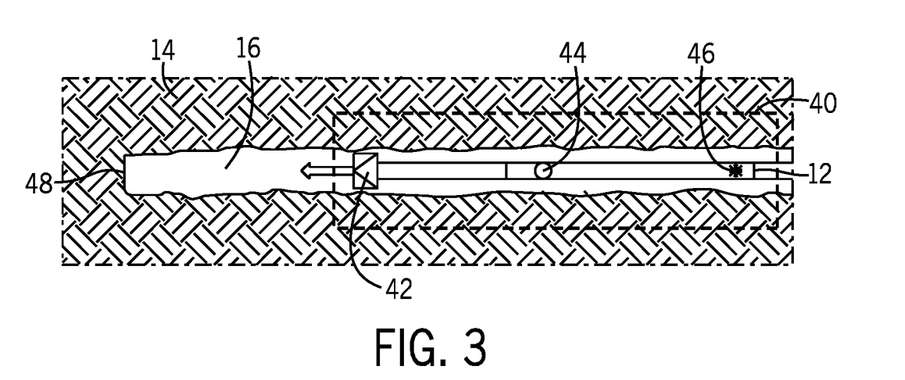
FIG. 3 is an illustration of a bottom-hole assembly including an acoustic tool, in accordance with an embodiment.

As stated above, the acoustic tool 12 may be implemented as part of a bottom-hole assembly (BHA) 40, as depicted in FIG. 3. The BHA 40 may include a drill bit 42 and the acoustic tool 12. Additionally, the acoustic tool 12 may include a Stoneley wave sensor 44 (e.g., any suitable acoustic wave detector, such as an acoustic transducer) and a Stoneley wave source 46 (e.g., any suitable acoustic wave generator, such as an acoustic transducer). Stoneley waves are emitted by the wave source 46 in a continuous or pulsed fashion, and travel along the borehole wall and are sensed by the wave sensor 44. In some embodiments, the continuous emission includes a train or sequence of multiple pulses. Based on the wave sensor measurement, the distance between the acoustic tool 12 and the bottom of the borehole 48 may then be calculated.

Figure 4:
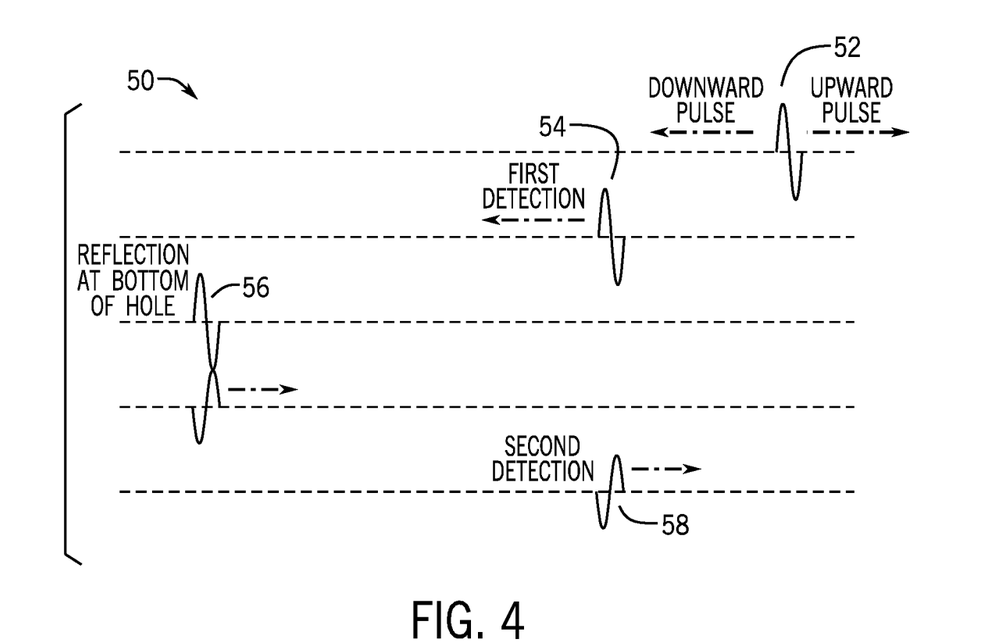
FIG. 4 is a timing diagram of a wave propagating in a borehole, in accordance with an embodiment.

FIG. 4 depicts a time diagram 50 showing the progression of the Stoneley waves in time. At time 52 a Stoneley wave pulse is produced at the Stoneley wave source 46. Due to the physical nature of the borehole 16 and Stoneley waves, the Stoneley wave emission may include two pulses, one traveling up the borehole 16 towards the surface and one traveling down the borehole 16 towards the bottom of the borehole 48. As depicted at time 54, the downward traveling Stoneley wave pulse may be detected by the wave sensor 44. After passing the wave sensor 44 the Stoneley wave pulse travels along the wall of the borehole 16 until it reaches the bottom of the borehole 48. Upon reaching the bottom of the borehole 48, the Stoneley wave pulse may be at least partially reflected due to the change in interface as shown at time 56. This partial reflection may reduce the amplitude of the Stoneley wave by creating other waves. For example, the interface may cause parts of the Stoneley wave to be converted to compressional and/or shear waves that may then be lost in the volume of the borehole 16. Afterwards, at time 58, the reflected Stoneley wave pulse travels back up the borehole 16 to be detected a second time by the wave sensor 44. Although the time diagram 50 depicts one Stoneley wave traveling through the borehole 16, it will be appreciated that multiple wave pulses, such as a wave train, may be used. As such, each subsequent pulse may be emitted before or after the previous pulse has made its roundtrip to the bottom of the borehole 48.

In order to determine the distance from the drill bit 42 to the bottom of the borehole 48, the data processing system 28 may compute a temporal measurement of the time difference between the first detection of the Stoneley wave pulse at time 54 and the second detection of the Stoneley wave pulse at time 58, thus defining a roundtrip travel time for the Stoneley wave pulse. Multiplying the roundtrip time by the speed of the Stoneley wave pulse may then yield an estimated distance between the wave sensor 44 and the bottom of the borehole 48. Stoneley waves within a borehole 16 generally propagate at approximately 1350 m/s (meters per second), and this estimation may be used in the calculation. However, the speed of Stoneley waves can vary based on the conditions in the borehole 16 (e.g., formation porosity, tool placement, etc.). As such, a speed approximation in a particular borehole 16 and position therein may be used by dividing the distance between the wave source 46 and the wave sensor 44 by the time between emission, time 52, and the first detection of the Stoneley wave pulse, time 54. Thus, the distance between the wave sensor 44 and the bottom of the borehole 48 may be calculated. Furthermore, the distance between the drill bit 42 and the wave sensor 44 may be fixed and known prior to placing the BHA 40 downhole. Subtracting out this distance may then yield an estimated distance between the drill bit 42 and the bottom of the borehole 48.

Figure 5:
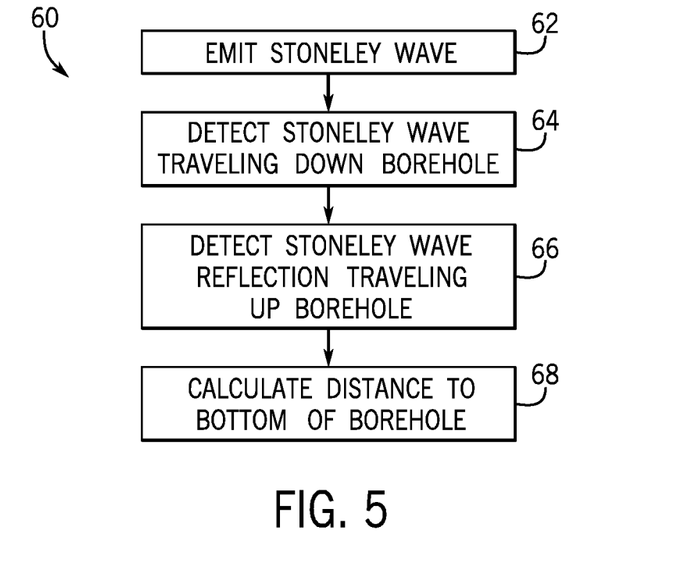
FIG. 5 is a flowchart of a process for locating a bottom of a borehole using an acoustic tool, in accordance with an embodiment.

FIG. 5 depicts a flow chart 60 outlining the process to calculate the distance to the bottom of the borehole 48. The data processing system 28 of the acoustic tool 12 may send a signal to the wave source 46 to emit one or more Stoneley waves (process block 62). The wave sensor 44 may then detect the Stoneley wave(s) traveling down the borehole (process block 64) and then again when the Stoneley wave(s) are traveling back up the borehole (process block 66). The sensor signals may then be sent to the data processing system 28 for calculating the distance to the bottom of the borehole 48 (process block 68).

As will be appreciated, the Stoneley waves may encounter multiple interface changes along the wall of the borehole 16 before and after the multiple detections. These interface changes, such as fractures in the borehole 16, may cause other reflections in addition to the reflection of the Stoneley wave pulse at the bottom of the borehole 48. Additionally, interface changes may also change the amplitude/intensity of the Stoneley waves, as part of the wave may be transmitted past the interface, while the other part is reflected. Furthermore, compressional and/or shear waves may also be produced as a result of the Stoneley waves interacting with the borehole 16. As such, the wave sensor 44 may detect multiple waves in addition to the expected Stoneley wave. When determining the roundtrip time of a Stoneley wave, the data processing system 28 may take these and other factors into account, for example by disregarding (e.g., filtering) the compressional/shear waves or other signals corresponding to discontinuities in the borehole.

Figure 6:
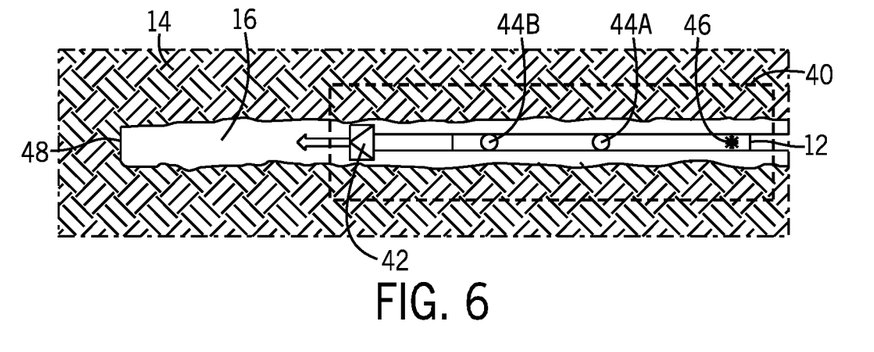
FIG. 6 is an illustration of a bottom-hole assembly including an acoustic tool with multiple detectors, in accordance with an embodiment.

In one embodiment, the acoustic tool 12 may include two wave sensors, 44A and 44B, as shown in FIG. 6. Using two or more wave sensors 44 may assist accurate detection of the Stoneley waves and improve the identification of which Stoneley wave corresponds to each emission. For example, using two or more sensors may allow the data processing system 28 to ascertain a direction for a detected wave.

Figure 7:
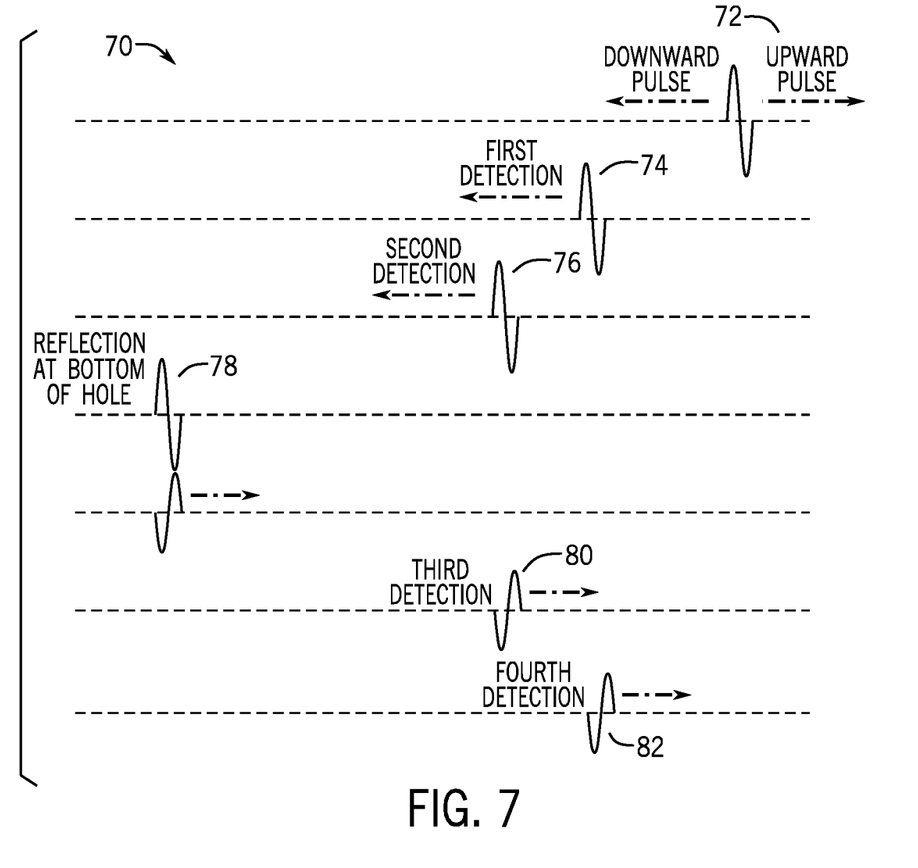
FIG. 7 is a timing diagram of a wave propagating in a borehole, in accordance with an embodiment.

As shown in the time diagram 70 illustrated in FIG. 7, multiple detections of the same Stoneley wave may be detected on each leg of the roundtrip. As with a previous embodiment, time 72 shows a Stoneley wave pulse that may include two pulses, one traveling up the borehole 16 towards the surface and one traveling down the borehole 16 towards the bottom of the borehole 48. As depicted at time 74, the downward traveling Stoneley wave pulse may be detected by the wave sensor 44A. After passing the first wave sensor 44A the Stoneley wave pulse then passes, and is detected by, the second wave sensor 44B, at time 76. The Stoneley wave then travels along the wall of the borehole 16 until it is reflected at the bottom of the borehole 48 as shown at time 78. Afterwards, at time 80, the Stoneley wave pulse travels back up the borehole 16 to be detected again by the wave sensor 44B, and then again by wave sensor 44A, at time 82.

The direction of travel for a detected wave may be inferred by first detecting the wave at one wave sensors (44A or 44B) and subsequently sensing the wave at a different wave sensor (44B or 44A). For example, sensing at wave sensor 44A first and then at wave sensor 44B would indicate a downward traveling wave. As will be appreciated, the speed of the Stoneley wave may also be calculated by noting the time between detection at the multiple wave sensors 44.

As stated above, multiple waves may be present in the borehole 16. These waves may be emitted as part of a wave train, as compressional or shear waves, or as reflections and/or transmissions thereof. Additionally, the waves may superimpose on each other. To assist in overcoming the difficulties these multiple waves may present, in one embodiment, a pulse sequence, such as a pseudo-random or pseudo-random auto-correlating pulse sequence, may be employed to help distinguish between the multiple wave pulses passing the wave sensors 44 in the borehole 16.

A pseudo-random sequence may have a series of wave pulses that are output at seemingly random time intervals. However, at the end of a period, the entire sequence may be repeated. These sequences may be based, at least in part, on a primitive polynomial or other function. Because of the pseudo-randomness of the output Stoneley wave pulses, the interference of the multiple waves may be filtered and/or reduced. Additionally, the auto-correlation of the output Stoneley wave pulses with their associated pseudo-random output times may assist in keeping track of which detection belongs to which Stoneley wave. This correlation may be done using an auto-correlation function, and, thus, may lead to a more accurate measurement of distance to the bottom of the borehole 48.

Figure 8:
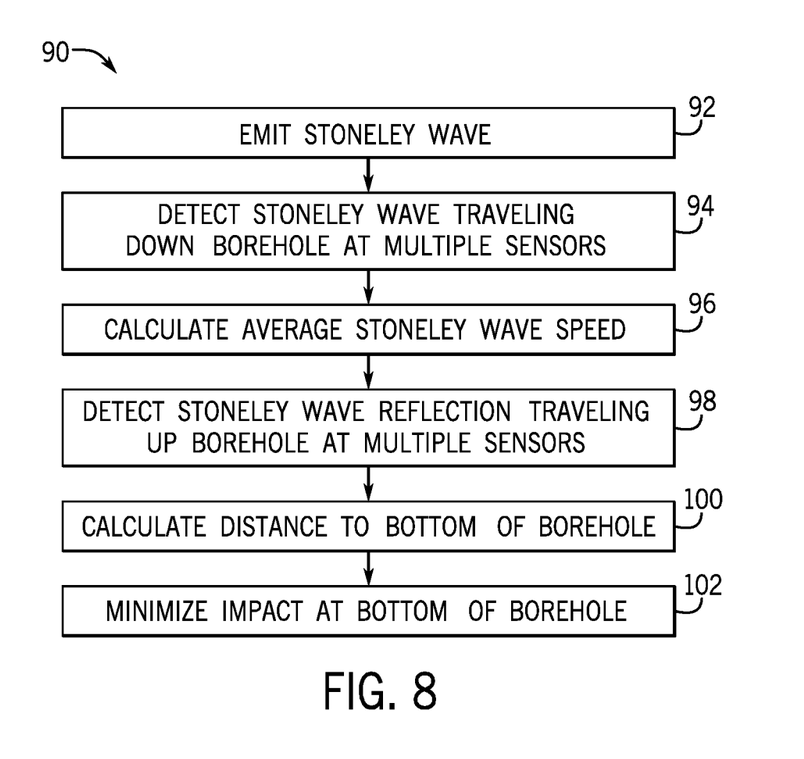
FIG. 8 is a flowchart of a process for locating a bottom of a borehole using an acoustic tool, in accordance with an embodiment.

Flow chart 90, as shown in FIG. 8 describes another embodiment of a process to calculate the distance to the bottom of the borehole 48, beginning with emitting Stoneley waves in a pulse sequence (e.g., a pseudo-random, auto-correlating pulse sequence) (process block 92). In some embodiments, the data processing system 28 may control the emission of the Stoneley waves in the pseudo-random, auto-correlating sequence. The Stoneley waves may then be detected by the multiple wave sensors 44 (process block 94). Using the signals from at least one of the multiple wave sensors 44, the data processing system 28 may calculate an estimated Stoneley wave speed (process block 96). As the Stoneley waves make their way back up the borehole 16, they once again pass the multiple wave sensors 44 and are detected (process block 98). The data processing system 28 may calculate the distance to the bottom of the borehole 48 (process block 100). For example, the data processing system 28 may use an auto-correlation function, combined with the known emitted sequence, to distinguish the Stoneley wave detections. Additionally, the data processing system 28 may take the calculated distance and use the measurement to control or provide feedback for the descent of the BHA 40, and thus reduce, minimize, and/or optimize its impact at the bottom of the borehole 48 (process block 102).

Figure 9:
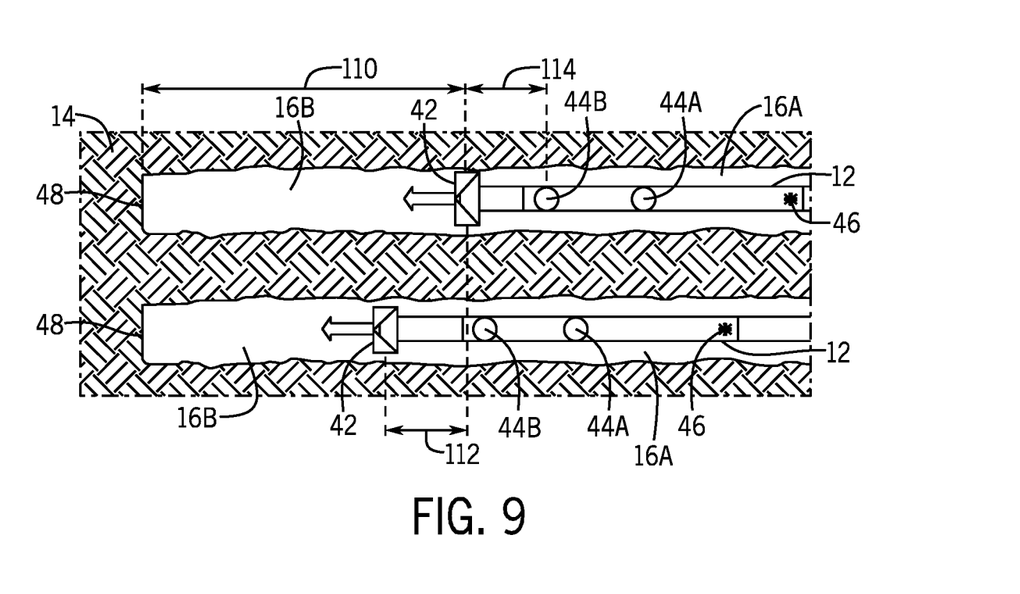
FIG. 9 is an illustration of a bottom-hole assembly including an acoustic tool at multiple depths within a borehole, in accordance with an embodiment.

As will be appreciated, the measurements taken by the acoustic tool 12, as described above, may be taken while the BHA 40 is stationary or in motion. However, using measurements taken at multiple depths within the borehole 16 may lead to a more accurate calculation of the speed of the Stoneley waves, and thus the overall calculation of the distance to the bottom of the borehole 48. In the previous examples, the estimation of the Stoneley waves' speed gave the speed of the Stoneley waves in the section of the borehole 16A that is adjacent to the BHA 40 and/or the tool string as depicted in FIG. 9. However, the Stoneley waves may propagate at a different speed in a section of the borehole 16B that is vacant (i.e., is not adjacent to the BHA 40 or the tool string). As such, taking into account the speed in both sections of the borehole 16A and 16B may further increase the accuracy of the distance measurement.

The calculation of the distance to the bottom of the borehole 48 and the speeds of the Stoneley waves may be solved simultaneously in a system of linear equations by defining certain variables/known quantities. For example, variables may include a starting distance 110 between the drill bit 42 and the bottom of the borehole 48, a distance traveled 112 when moving the acoustic tool 12 to a new location, and a tool distance 114 between the drill bit 42 and the wave sensor 44B, the measured roundtrip time at the $1^{st}$ position, the measured roundtrip time at the $2^{nd}$ position, and the speeds in the two sections of the borehole 16A and 16B. As will be appreciated, the wave sensor 44A may also be used with the proper adjustments to the equations.

Roundtrip time at $1^{st}$ position=2×(Distance 110)/ (Speed in 16B)+2×(Distance 114)/(Speed in 16A)  (EQ I)

Roundtrip time at $2^{nd}$ position=2×((Distance 110)− (Distance 112))/(Speed in 16B)+2×(Distance 114)/(Speed in 16A)  (EQ II)

When using the above equations, the distance traveled 112 and tool distance 114 are known quantities and the speed of the Stoneley waves in the section of the borehole 16A that is adjacent to the tool may be calculated as explained above, leaving two equations and two unknowns. As will be appreciated, multiple measurements at multiple depths in the borehole 16 may be used to increase the accuracy of the distance measurement, each new measurement adding another equation. Additionally, if three or more measurements are taken, the speed of the Stoneley wave in the section of the borehole 16A that is adjacent to the tool may also be calculated via the system of linear equations. Furthermore, because wave sensor 44A may have a different depth in the borehole 16 than wave sensor 44B, a single location of the BHA 40, may yield an equation for each of the multiple wave sensors 44 of the acoustic tool 12.

Figure 10:
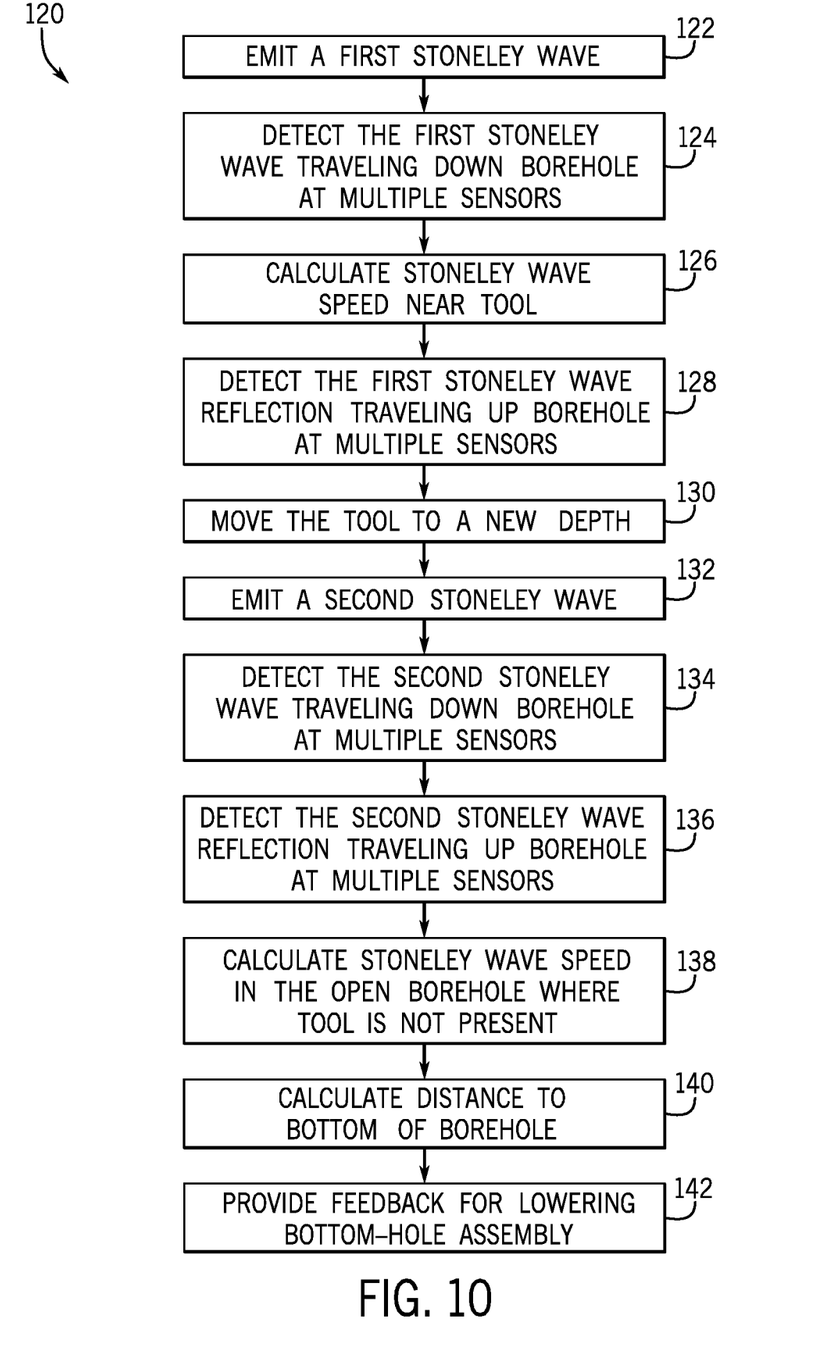
FIG. 10 is a flowchart of a process for locating a bottom of a borehole using an acoustic tool, in accordance with an embodiment.

One embodiment is shown in the flow diagram 120 of FIG. 10, beginning with a first Stoneley wave being emitted (process block 122). This may take the form of a pulse, a wave train, a pseudo-random sequence of pulses, a continuous waveform, or a combination thereof. As the first Stoneley wave passes the multiple wave sensors 44, the wave is detected (process block 124), and the speed of the Stoneley wave in the section of the borehole 16A that is adjacent to the BHA 40 may be calculated (process block 126). The Stoneley wave is then reflected off of the bottom of the borehole 48, and detected again by the multiple wave sensors 44 (process block 128). The data processing system 28 may then coordinate the movement of the BHA 40 to a new depth in the borehole 16 (process block 130). The emission and detection of a second Stoneley wave and its reflection is then repeated at this new depth (process blocks 132, 134, and 136). The speed of the Stoneley waves in the section of the borehole 16B that is vacant may then be calculated (process block 138), along with the distance to the bottom of the borehole 48 (process block 140). Once the distance has been calculated, the data processing system 28 may then provide feedback for lowering the BHA 40 to the bottom of the borehole 48 (process block 142). For example, the data processing system 28 may control the lowering speed of the BHA. As will be appreciated, moving the BHA 40 may be operated by a separate controller, and the data processing system 28 may simply provide measurement data instead of actively controlling the movement. Furthermore, although the steps of flow charts 60, 90, and 120 have been depicted in an order, as will be appreciated, in certain embodiments, portions of the flow charts may be reordered, deleted, and/or occur simultaneously.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A downhole tool system comprising:
a Stoneley wave emitter in a downhole tool, wherein the Stoneley wave emitter is configured to emit Stoneley waves into a borehole;
one or more Stoneley wave sensors in the downhole tool; and
a processor configured to receive signals from the one or more Stoneley wave sensors based on a detection of the Stoneley waves, use the signals to obtain a temporal measurement of the Stoneley waves, and calculate a distance from the downhole tool or a bottom-hole assembly to a bottom of the borehole based at least in part on the temporal measurement, and
wherein the processor is configured to disregard signals corresponding to discontinuities in a wall of the borehole.

2. The downhole tool system of claim 1, wherein the temporal measurement comprises a time from a first sensing of a Stoneley wave to a second sensing of the Stoneley wave after the Stoneley wave has reflected off the bottom of the borehole.

3. The downhole tool system of claim 1, wherein the processor is configured to use the signals to calculate a speed of the Stoneley waves in the borehole.

4. The downhole tool system of claim 1, wherein the one or more Stoneley wave sensors comprises at least two Stoneley wave sensors.

5. The downhole tool system of claim 4, wherein the processor is configured to calculate a direction of travel of the Stoneley waves based at least in part on the signals from the at least two Stoneley wave sensors.

6. The downhole tool system of claim 1, wherein the processor is configured to control the Stoneley wave emitter to emit a pseudo-random, auto-correlating pulse sequence and calculate the distance from the downhole tool or the bottom-hole assembly to the bottom of the borehole based at least in part on a correlation of the emitted pseudo-random, auto-correlating pulse sequence and the signals from the one or more Stoneley wave sensors.

7. The downhole tool system of claim 1, wherein the processor is configured to obtain a plurality of temporal measurements corresponding to a plurality of distances away from the bottom of the borehole.

8. The downhole tool system of claim 7, wherein the processor is configured to use the plurality of temporal measurements to calculate a speed of Stoneley waves in the borehole next to the downhole tool and a speed of Stoneley waves in the borehole beyond the downhole tool.

9. The downhole tool system of claim 8, wherein the processor is configured to use the plurality of temporal measurements, the speed of Stoneley waves next to the downhole tool, and the speed of Stoneley waves in the borehole beyond the downhole tool to calculate the distance from the downhole tool or a bottom-hole assembly to a bottom of the borehole.

10. The downhole tool system of claim 1, wherein the Stoneley waves comprise wave pulses.

11. The downhole tool system of claim 1, wherein the processor is configured to disregard signals corresponding to compressional or shear waves.

12. The downhole tool system of claim 1, wherein the Stoneley wave emitter is configured to emit Stoneley waves substantially continuously, and the processor is configured to substantially continuously calculate the distance from the downhole tool or a bottom-hole assembly to the bottom of the borehole while the downhole tool approaches the bottom of the borehole.

13. A method comprising:
  emitting, from a downhole tool in a bottom-hole assembly comprising a drill bit, a plurality of Stoneley waves into a borehole in a pulse sequence, while the drill bit is off a bottom of the borehole and is being lowered to the bottom of the borehole;
  detecting, via a plurality of sensors, the plurality of Stoneley waves traveling in the borehole; and
  calculating, via a processor, a distance from the downhole tool to the bottom of the borehole based at least in part on the speed of the plurality of Stoneley waves in the borehole and a time between detections of the plurality of Stoneley waves.

14. The method of claim 13 comprising reducing or minimizing an impact of the downhole tool with the bottom of the borehole based at least in part on the calculated distance from the downhole tool to the bottom of the borehole.

15. The method of claim 13, wherein the pulse sequence is a pseudo-random, auto-correlating pulse sequence, and wherein calculating the distance from the downhole tool to the bottom of the borehole comprises correlating the pseudo-random, auto-correlating pulse sequence with a detected plurality of Stoneley waves traveling up a wall of the borehole after reflecting off the bottom of the borehole.

16. The method of claim 13, wherein the plurality of Stoneley waves comprises a first plurality of Stoneley waves, and wherein the method comprises:
  moving the downhole tool a known distance to a new position in the borehole; and
  emitting and sensing a second plurality of Stoneley waves into the borehole at the new position.

17. The method of claim 16, comprising calculating, via the processor, a speed of the first plurality of Stoneley waves while propagating along a wall of the borehole while adjacent to the downhole tool and a speed of the first plurality of Stoneley waves while propagating along the wall of the borehole while not adjacent to the downhole tool.

18. Machine-executable instructions stored on a tangible, non-transitory machine readable storage medium, which, when executed by a machine, causes the machine to perform a method, the method comprising:
  controlling an emission of one or more Stoneley waves at a plurality of locations in a borehole;
  processing signals received from one or more Stoneley wave sensors, wherein the signals are representative of the one or more Stoneley waves sensed within the borehole;
  calculating a direction of travel of the one or more Stoneley waves;
  calculating a roundtrip time of the one or more Stoneley waves propagating down the borehole and reflecting back to the one or more Stoneley wave sensors based at least in part on the direction of travel of the one or more Stoneley waves;
  calculating a distance from a bottom-hole assembly to the bottom of the borehole based at least in part on the roundtrip time of the one or more Stoneley waves;
  calculating a first speed of Stoneley waves corresponding to the one or more Stoneley waves propagating adjacent to the bottom-hole assembly; and
  calculating a second speed of Stoneley waves corresponding to the one or more Stoneley waves propagating in a section of the borehole not adjacent to the bottom-hole assembly.

\* \* \* \* \*